US012679752B2

(12) United States Patent
Leung et al.

(10) Patent No.: US 12,679,752 B2
(45) Date of Patent: Jul. 14, 2026

(54) METHOD AND SYSTEM FOR THE EFFICIENT AND SUSTAINABLE ELECTROCHEMICAL TREATMENT OF WASTEWATER

(71) Applicant: AXINE WATER TECHNOLOGIES INC., Vancouver (CA)

(72) Inventors: Victor Ka Lun Leung, New Westminster (CA); Wing Kan Wong, Richmond (CA)

(73) Assignee: AXINE WATER TECHNOLOGIES INC., Vancouver (CA)

( * ) Notice: Subject to any disclaimer, the term of this patent is extended or adjusted under 35 U.S.C. 154(b) by 1255 days.

(21) Appl. No.: 17/610,646

(22) PCT Filed: May 12, 2020

(86) PCT No.: PCT/US2020/032480
§ 371 (c)(1),
(2) Date: Nov. 11, 2021

(87) PCT Pub. No.: WO2020/231995
PCT Pub. Date: Nov. 19, 2020

(65) Prior Publication Data
US 2023/0026118 A1 Jan. 26, 2023

Related U.S. Application Data

(60) Provisional application No. 62/847,158, filed on May 13, 2019.

(51) Int. Cl.
*C02F 1/467* (2023.01)
*C02F 1/00* (2023.01)
(Continued)

(52) U.S. Cl.
CPC ............ *C02F 1/4672* (2013.01); *C02F 1/008* (2013.01); *C02F 1/46109* (2013.01);
(Continued)

(58) Field of Classification Search
CPC .......... C02F 1/70; C02F 1/72; C02F 1/46109; C02F 1/008; C02F 1/4672
See application file for complete search history.

(56) References Cited

U.S. PATENT DOCUMENTS 6,315,886 B1 * 11/2001 Zappi ................. C02F 1/46109
204/266
2001/0004962 A1 6/2001 Hirota et al.
(Continued)

FOREIGN PATENT DOCUMENTS

EP 2837603 B1 * 6/2020 ............ C02F 1/4672
WO WO-2012145689 A2 * 10/2012 .......... B01F 3/04737

OTHER PUBLICATIONS

Sequential_Combination_of_Electro-Fenton_and_Electrochemical_Chlorination_Processes_for_the_Treatment_of_Anaerobically-Digested_Food_Wastewater.pdf (Year: 2017).*

*Primary Examiner* — Luan V Van
(74) *Attorney, Agent, or Firm* — Seed Intellectual Property Law Group LLP

(57) ABSTRACT

A system for an efficient and sustainable electrochemical treatment of wastewater comprises a reactor tank, a first electrolyzer with a stack of electrolytic cells, each electrolytic cell comprising an anode of a first composition, and a second electrolyzer with a stack of electrolytic cells, each electrolytic cell comprising an anode of a second composition, and a contaminant concentration measuring device for monitoring the contaminant concentration in the reactor tank to the first or to the second electrolyzer. Wastewater to be treated is supplied from the reactor tank to the first electrolyzer until the contaminant concentration becomes substan-
(Continued)

tially constant as measured by the contaminant removal rate being around 0 mg/h, which indicates the buildup of byproducts generated in the first electrolyzer, at which time the wastewater is supplied from the reactor tank to the second electrolyzer with anodes which can efficiently treat the byproducts of the reaction in the first electrolyzer.

7 Claims, 4 Drawing Sheets

(51) Int. Cl.
    *C02F 1/461*       (2023.01)
    *C02F 101/34*      (2006.01)

(52) U.S. Cl.
    CPC ............... *C02F 2001/46147* (2013.01); *C02F 2101/34* (2013.01); *C02F 2201/46145* (2013.01); *C02F 2201/46185* (2013.01); *C02F 2209/006* (2013.01); *C02F 2209/08* (2013.01); *C02F 2209/20* (2013.01); *C02F 2209/44* (2013.01); *C02F 2301/08* (2013.01)

(56) References Cited

U.S. PATENT DOCUMENTS

| | | | |
|---|---|---|---|
| 2008/0087552 A1* | 4/2008 | Pellet ................... | C02F 1/4672 204/267 |
| 2013/0299361 A1* | 11/2013 | Wylie ................... | C02F 1/4672 204/273 |
| 2015/0298998 A1 | 10/2015 | Legzdins | |
| 2018/0086652 A1* | 3/2018 | Hoffmann ........... | C02F 1/46109 |

* cited by examiner

METHOD AND SYSTEM FOR THE EFFICIENT AND SUSTAINABLE ELECTROCHEMICAL TREATMENT OF WASTEWATER

TECHNICAL FIELD

The present invention relates to a system and a method for electrochemically treating wastewater while extending the service life of the electrodes to achieve an efficient and sustainable contaminant removal process.

BACKGROUND

Wastewater treatment systems are high in demand due to tighter wastewater disposal regulations, whereby industrial facilities are required to eliminate their recalcitrant water pollutants prior to discharge, and due to the current global shortage of clean water. Therefore, there is an increasing demand for cost-effective, sustainable wastewater treatment systems that minimize the addition of chemicals, do not produce secondary pollution, and have minimal operational and maintenance requirements.

The preferred approach to treating recalcitrant wastewater is by electrochemical oxidation, which is a sustainable, safe and highly efficient treatment solution for eliminating a wide variety of pollutants such as persistent organic pollutants, dioxins, nitrogen species (e.g. ammonia), pharmaceuticals, pathogens, microorganisms and others. One approach for treating wastewater is by direct electrochemical oxidation of organic and/or inorganic pollutants whereby such pollutants are oxidized directly on the anode surface. Another method is the indirect electrochemical oxidation of organic and/or inorganic pollutants through the in-situ generation of chemically oxidizing species (such as hydroxyl, chlorine, oxygen or perchlorate radicals or compounds such as ozone, or hydrogen peroxide). These chemically oxidizing species are generated directly on the anode surface and subsequently oxidize the pollutants within the wastewater solution.

The wastewater treatment through electrochemical oxidation can generate certain by-products which, in some cases, cannot be treated by the same type of electrode that is used for treating the contaminants in the wastewater or, in other cases, can damage the electrodes even when present in low concentrations.

The prior art has failed to address the effects of the by-products formed during the wastewater treatment by electrochemical oxidation on the electrodes being used, which are selected based on the original composition of the wastewater that needs to be treated, respectively on the composition and contaminant concentration of the wastewater stream generated at the industrial site which needs to be discarded. Some prior art documents describe using different electrodes for treating different wastewater compositions, whereby the composition of the electrodes is chosen based on the contaminants contained in the wastewater that needs to be treated. U.S. Pat. No. 10,144,659 describes using an electrolyzer equipped with a first type of anode for oxygen evolution, for example an electrode coated with tin and antimony oxides which is connected in parallel to a second electrolyzer equipped with a second type of anode for oxygen evolution having a higher overvoltage for oxygen evolution than the first type of anode, for example a boron-doped diamond electrode, with the two electrolyzers being configured for simultaneous use in the COD treatment of effluents by anodic oxidation. In this prior art document the electrodes are chosen based solely on the original composition of the wastewater to be treated and are used simultaneously, in parallel, for treating the wastewater supplied to the device. The rationale behind this arrangement, as described in this prior art document, is to utilise to a highest degree the handier and less expensive elements, that is the tin and antimony oxide-based anodes and to a lesser extent the BDD electrodes installed in their own appropriate electrolyser.

Such a prior art arrangement achieves the treatment in parallel of a wastewater stream with the same contaminants while achieving a different level of performance for each of the electrolyzers, e.g. a higher level of performance for the electrolyzer with the electrodes of a higher overvoltage for oxygen evolution (the BDD electrodes). Reducing and dealing with the effects of the by-products resulted during the treatment of the wastewater in any of the two electrolyzers are not discussed.

None of the known prior art documents has recognized that some by-products generated during the treatment of wastewater by electrochemical oxidation can not be efficiently treated, especially in larger amounts, by the type of electrodes which is chosen based on the original contaminant composition of the wastewater. For example, the acetone generated during the treatment of wastewater containing isopropyl alcohol (IPA), when present in high concentration, is not efficiently treated by the precious metal oxide (PMO) electrodes which are known to be used for treating IPA. In other cases, for example in the electrochemical treatment of wastewater containing IPA using boron-doped diamond (BDD) electrodes, certain by-products (e.g. acetic acid) corrode the electrodes and shorten their lifespan which has a negative economic impact considering the cost of electrodes. The connection in parallel of the two electrolyzers described for example in the U.S. Pat. No. 10,144,659 mentioned above would therefore not be efficient in addressing this problem.

The electrodes used for wastewater treatment in the prior art have been chosen based on the contaminants in the original stream of wastewater to be treated. For example, as mentioned above, PMO electrodes have been selected to treat wastewater containing IPA without taking in consideration that acetone is generated during treatment and that PMO electrodes are not efficient in treating such a byproduct when present in high concentration and BDD electrodes have been selected to treat wastewater containing IPA, because they are efficient in treating such contaminants without taking in consideration the generation of by-products such as acetic acid which damages the BDD electrodes.

Therefore there is still a need to improve the wastewater treatment efficiency in order to provide a more efficient and sustainable method and system for treating wastewater by taking in consideration the by-products generated during the treatment of the wastewater with one type of electrodes.

SUMMARY OF THE INVENTION

The present invention describes a method for the electrochemical treatment of wastewater comprising the steps of:
  a. supplying a wastewater stream to be treated to a reactor tank,
  b. treating the wastewater from the reactor tank in a first electrolyzer comprising a stack of electrolytic cells, each electrolytic cell comprising an anode of a first composition and discarding an effluent stream from the first electrolyzer back into the reactor tank,
  c. monitoring the contaminant concentration in the wastewater from the reactor tank, d. repeating the step of treating the wastewater in the first electrolyzer and discarding the effluent stream from the first electrolyzer into the reactor tank until the contaminant concentration in the wastewater to be treated becomes substantially constant;

e. when the concentration in the wastewater to be treated becomes substantially constant, stopping the treatment of wastewater in the first electrolyzer and treating the wastewater from the reactor tank in a second electrolyzer comprising a stack of electrolytic cells, each electrolytic cell comprising an anode of a second composition, which is different than the first composition of the anodes in the first electrolyzer, f. treating the wastewater in the second electrolyzer and discarding an effluent stream from the second electrolyzer back to the reactor tank, g. monitoring the contaminant concentration in the wastewater from the reactor tank, h. discarding the effluent stream from the second electrolyzer back to the reactor tank until the contaminant concentration in the wastewater from the reactor tank reaches a predetermined target value, and i. discarding the wastewater from the reactor tank at a predetermined location.

In the present method, the contaminant concentration is monitored by measuring the chemical oxygen demand concentration in the wastewater or by measuring the total organic carbon concentration in the wastewater.

The first composition of the anode of the first electrolyzer is selected from the materials which can treat the main contaminants in the wastewater stream and which are preferably not substantially damaged by the by-products generated in the first electrolyzer. The second composition of the anode of the second electrolyzer is selected from the materials which can treat the byproducts of the reaction in the first electrolyzer or, alternatively, it can be selected to also treat the main contaminants in the wastewater.

In preferred embodiments, the treatment of the wastewater from the reactor tank in the first electrolyzer is stopped and the wastewater from the reactor tank begins to be treated in the second electrolyzer when the contaminant removal rate in the stream of wastewater supplied from the reactor tank drops to around 0 mg/h, which indicates that the contaminant concentration in the wastewater being supplied from the reactor tank, as indicated by the chemical oxygen demand concentration, or the total organic carbon concentration, remains substantially constant.

In some embodiments, the wastewater treatment in the first electrolyzer is stopped and wastewater begins to be treated in a second electrolyzer at a time which was determined experimentally to correspond to the time when the contaminant concentration in the wastewater from the reactor tank becomes substantially constant or when the contaminant removal rate is around a predetermined value. In preferred embodiments such predetermined value is around 0 mg/h.

In one example, the wastewater to be treated contains isopropyl alcohol or isopropyl alcohol and acetone and the first composition of the anode of the first electrolyzer comprises a precious metal oxide and the second composition of the anode of the second electrolyzer comprises diamond or boron-doped diamond.

A system for the electrochemical treatment of wastewater is further disclosed comprising:

a. a reactor tank for holding the wastewater to be treated, b. a first electrolyzer comprising a stack of electrolytic cells, each electrolytic cell comprising an anode of a first composition, c. a second electrolyzer comprising a stack of electrolytic cells, each electrolytic cell comprising an anode of a second composition, d. a contaminant concentration measuring device for monitoring the contaminant concentration in the wastewater from the reactor tank, and e. a control unit for controlling the treatment of wastewater in the first electrolyzer and in the second electrolyzer, such that, at the beginning of the system operation, the wastewater is treated in the first electrolyzer and when the contaminant concentration in the wastewater to be treated becomes substantially constant, the control unit commands to stop the treatment of wastewater in the first electrolyzer and to start the treatment of wastewater in the second electrolyzer.

The contaminant concentration measuring device measures the chemical oxygen demand concentration in the wastewater from the reactor tank or, in some embodiments, it can measure the total organic carbon concentration in the wastewater from the reactor tank.

In the present system the first composition of the anode of the first electrolyzer is preferably selected from the materials which can treat the main contaminants in the wastewater stream supplied to first electrolyzer and which are not substantially damaged by the byproducts generated in the first electrolyzer.

The second composition of the anode of the second electrolyzer is selected from the materials which can treat the byproducts of the reaction in the first electrolyzer, or it can be selected from the materials which can also treat the main contaminants in the wastewater.

The wastewater treatment in the first electrolyzer is stopped and the wastewater is treated in the second electrolyzer when the contaminant removal rate drops to a predetermined value, for example around 0 mg/h. which indicates that the contaminant concentration in the wastewater remains substantially constant.

In other embodiments, the wastewater is supplied from the reactor tank to the first electrolyzer until a predetermined time which was determined experimentally to correspond to the time when the contaminant removal rate reaches about 0%.

In one example, the wastewater contains isopropyl alcohol or isopropyl alcohol and acetone and the first composition of the anode of the first electrolyzer comprises a precious metal oxide and the second composition of the anode of the second electrolyzer comprises diamond or boron-doped diamond.

BRIEF DESCRIPTION OF THE DRAWINGS

The drawings illustrate specific preferred embodiments of the invention, but should not be considered as restricting the spirit or scope of the invention in any way.

DETAILED DESCRIPTION

Certain terminology is used in the present description and is intended to be interpreted according to the definitions provided below. In addition, terms such as "a" and "comprises" are to be taken as open-ended.

Herein, in a quantitative context, the terms "about" and "around" should be construed as being in the range up to plus 10% and down to minus 10%. Similarly the term "substantially constant" should be construed as varying within + to −10% of a median value over a period of time.

Figure 1:
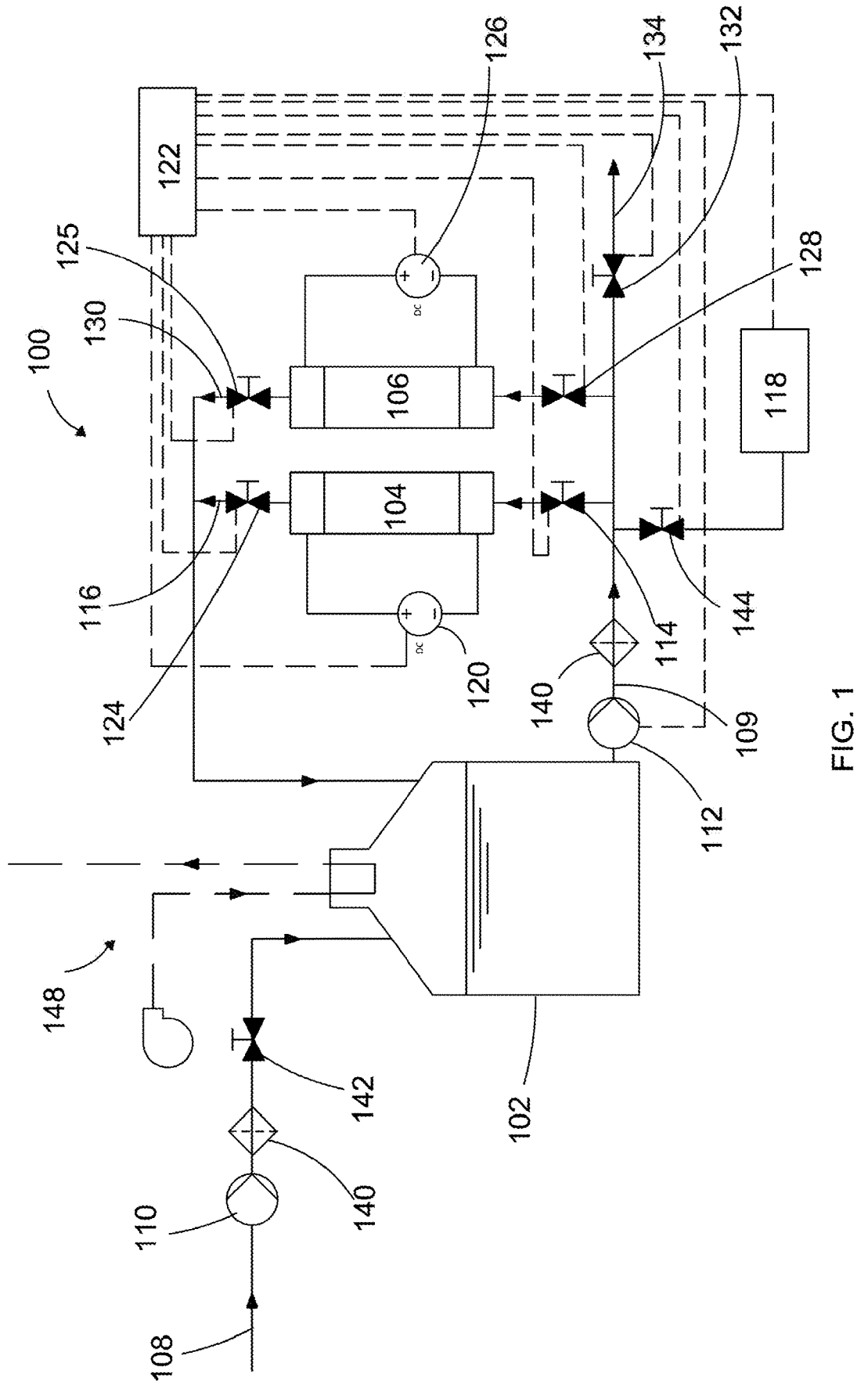
FIG. 1 illustrates a schematic of a system for treating wastewater comprising two electrolyzers having different types of electrodes according to the present invention.

A wastewater treatment system according to the preferred embodiment of the present invention is illustrated in FIG. 1.

The electrochemical wastewater treatment system 100 comprises a reactor tank 102, a first electrolyzer 104 comprising a stack of electrolytic cells, each electrolytic cell comprising an anode of a first composition, and a second electrolyzer 106 comprising a stack of electrolytic cells, each electrolytic cell comprising an anode of a second composition.

The stream of wastewater to be treated 108 is fed through a pump 110 to the reactor tank 102 and from the reactor tank the wastewater stream 109 is fed through a pump 112 and a flow control valve 114 to the first electrolyzer 104 where it is treated to remove the contaminants in the wastewater. After treatment, the effluent stream 116 from the first electrolyzer 104 is returned to the reactor tank 102 to be further recirculated to the first electrolyzer 104. This cycle is repeated and at the beginning of each cycle, the contaminant concentration in the stream of wastewater fed to the first electrolyzer 104 is measured by a contaminant concentration measurement device 118, as illustrated in FIG. 1. In other embodiments (not illustrated) the contaminant concentration in the wastewater can be measured at the exit from electrolyzer 104, as the contaminant concentration of the effluent stream 116 which is returned to the reactor tank 102 or directly in the reactor tank. In any of the embodiments, the contaminant concentration is preferably measured at the same location in the system for consistency purposes. During this process the power supply 120 is controlled by the system's control unit 122 to provide power to the first electrolyzer 104 while the second electrolyzer 106 is not active, and to keep the flow control valve 124 open to allow the recirculation of the wastewater from the first electrolyzer 104 back to the reactor tank 102.

In one embodiment of the present invention, the wastewater to be treated comprises such contaminants as isopropyl alcohol (IPA) or isopropyl alcohol and small amounts of acetone, which need to be removed before the wastewater is discarded at a designated location. In this embodiment the anodes of the first electrolyzer 104 are made of a precious metal oxide (PMO) which are anodes known in the art to be used for treating wastewater containing IPA. It was observed that the electrooxydation process which takes place in the first electrolyzer 104 generates acetone and, as the process continues, the contaminant concentration, as measured by the measurement device 118 becomes constant which indicates that the anodes of the first electrolyzer 104 can not further reduce the contaminants in the wastewater to be treated. This can be explained by the fact that the byproducts generated during the electrooxidation process, in this case the acetone, can reach a total amount which exceeds the amount of acetone that can be treated by the PMO anodes. While PMO anodes are known to treat the IPA in the wastewater they are not efficient in treating acetone in larger amounts.

When the measurement device 118 indicates that the contaminant concentration in the wastewater in the reactor tank becomes substantially constant, as illustrated for example by the contaminant removal rate (mg/h) being around zero, good results have been achieved by stopping the operation of the first electrolyzer 104, disconnecting the power supply 120 and closing the flow control valves 114 and 124 and supplying current from the power supply 126 to the second electrolyzer 106, opening the flow control valve 128 and supplying the stream of wastewater 109 from the reactor tank 102 to the second electrolyzer 106 through the open flow control valve 128. The second electrolyzer 106 has anodes made of diamond or boron doped diamond. Diamond electrodes are known for good results in treating wastewater containing acetone and IPA as well. Experimentally it was determined that diamond anodes can be damaged by the acetic acid which is a byproduct generated during the treatment of wastewater which contains IPA and therefore they do not last very long. It was determined that the production of acetic acid happens at a higher rate when the wastewater containing IPA is treated using diamond anodes than when using PMO anodes.

The system 100 continues to operate by supplying the wastewater from the reactor tank to the second electrolyzer 106 and returning the effluent stream 130, from the second electrolyzer 106 to the reactor tank 102 by opening flow control valve 125. The cycle of treatment in the second electrolyzer 106 is repeated until the contaminant concentration measurement device 118 indicates that the wastewater within the reactor tank was treated to an acceptable level of contamination to be discarded. Overall very good results in regards to contaminant removal and process efficiency were obtained as further illustrated in FIGS. 2, 3 and 4, and the life of the diamond electrodes was extended since the second electrolyzer was used to a larger extent to remove the acetone formed during the wastewater treatment through electrooxidation on the PMO anodes of the first electrolyzer and to a less extent to remove the IPA, the main contaminant in the wastewater, therefore generating less acetic acid.

When the contaminant concentration measurement device detects that the contaminants concentration in the wastewater has reached a predetermined value, as required by regulations, the system's control unit 122 commands the opening of the flow control valve 132 and the effluent stream of treated wastewater 134 is discarded from the system to a designated location.

Variations of the present concept can be enabled in different embodiments. For example, in preferred embodiments, the contaminant concentration measurement device 118 can measure the chemical oxygen demand (COD) concentration in the wastewater supplied from the reactor tank, while in other embodiments, the contaminant measurement device 118 measures the total organic carbon (TOC) concentration in the wastewater, where the COD and TOC concentrations are indicative of the amount of contaminant in the wastewater. Also, while in preferred embodiments the contaminant concentration, and respectively the COD and TOC concentrations are measured by the contaminant measurement device 118 which comprises sensors for sensing such concentrations, in alternative embodiments samples can be taken periodically from the wastewater to be treated and the contaminant concentrations can be determined in the lab from the collected samples.

While in the example described above, the anode in the first electrolyzer is made of a precious metal oxide and the anode in the second electrolyzer is made of boron doped diamond, in other embodiments other materials can be chosen for the anodes of the first electrolyzer, for example platinum group metals (PGM), titanium suboxides (i.e. Magneli TiOx) and, respectively, for the anodes of the second electrolyzer, for example carbon-based materials (glassy carbon or diamond) and mixed metal oxides. In general, the material of the anodes in the first electrolyzer is selected based on the contaminant composition of the wastewater to be treated and the material of the anodes in the second electrolyzer is selected from the materials which can destroy the byproducts generated during the treatment of the first electrolyzer. In some embodiments, the anodes of the second electrolyzer can also destroy at least one or the main contaminant in the wastewater to be treated which is originally supplied to the system from an outside source, but might be damaged by the byproducts generated during such treatment.

For example, in another embodiment, a stream of wastewater containing methanol ($CH_3OH$) and chloride is first treated in a first electrolyzer which comprises PMO anodes until the measurement device indicates a substantially constant contaminant concentration level or a contaminant removal rate close to 0 mg/h, which has been determined to be caused by the production of a byproduct of the reaction in the first electrolyzer identified as being chloroform ($CHCl_3$) and then the stream of wastewater from the reactor tank is treated in a second electrolyzer which comprises BDD electrodes which can efficiently treat the wastewater which now contains chloroform.

In preferred embodiments, the system's control unit 122 determines that a contaminant concentration plateau has been reached and powers the second electrolyzer to begin the wastewater treatment when the contaminant removal rate, measured in milligrams of contaminant or COD per hour, drops to around 0. In other embodiments, the timing of the switch between the first electrolyzer and the second electrolyzer for treating the wastewater stream can be determined experimentally in the lab based on when the contaminant concentration of the wastewater supplied from the reactor tank is reaching a plateau for a certain amount of wastewater having a detected contaminant composition, meaning that the contaminant concentration remains substantially constant, and the control unit switches the operation between the two electrolyzers in the industrial implementation of the system based on the recorded timing from the experiments.

In other embodiments, when the total organic carbon (TOC) in the wastewater at an instant time is monitored by the contaminant concentration measurement device and the control device determines that the total organic carbon concentration has become substantially constant, respectively has fluctuated between a certain range (for example plus or minus 10%), or when the TOC removal rate (TOC removed per hour) is around 0 mg/h, it triggers the activation of the second electrolyzer to begin the wastewater treatment.

In some embodiments the two electrolytic stacks, which are enclosed in the first and, respectively in the second electrolyzer of the embodiment illustrated in FIG. 1, can be placed directly in the reactor tank 102 and can be operated in the same manner by sequentially activating the power supply for each of the electrolytic stacks to treat the wastewater as described above. In such embodiments, no valves are necessary for supplying the wastewater to be treated to the first and respectively to the second electrolyzer.

In the present embodiment, the electrolyzers used in the experiments were flow-through reactors having PMO plate anodes/electrodes for the first electrolyzer and BDD plate anodes/electrodes for the second electrolyzer. A person skilled in the art would easily understand that other types of electrodes (e.g. bipolar, mesh electrodes) could be used for applying the present method.

Other auxiliary equipment shown in the drawings include a filter 140, flow control valves 142 and respectively 144 for controlling the supply of wastewater to and from the reactor tank 102 and a reactor tank ventilation system 148 for eliminating the gases formed during the electrooxidation treatment of wastewater. Such auxiliary equipment and its operation are known to a person skilled in the art.

The method for operating the present system described above and illustrated in FIG. 1 can be summarized as follows. The wastewater stream to be treated is supplied to a reactor tank 102 and from the reactor tank to a first electrolyzer 104 which comprises a stack of electrolytic cells, each electrolytic cell comprising an anode made of a first composition, for example precious metal oxide (PMO). The wastewater is treated in the first electrolyzer 104 and the effluent stream 116 from the electrolyzer is directed back to the reactor tank 102. This process is repeated until the contaminant concentration in the stream of wastewater 109 supplied from the reactor tank becomes substantially constant, as measured by a contaminant concentration measurement device 118 or when the contaminant removal rate, as calculated by the system's control unit 122 drops to around zero or below a predetermined value. At this time, the supply of wastewater to the first electrolyzer is stopped, the electrolyzer can be disconnected from its DC power supply 120, the second electrolyzer 106 is supplied with current from its own power supply 126, and the stream of wastewater to be treated is supplied from the reactor tank 102 to the second electrolyzer 106 which comprises a stack of electrolytic cells, each electrolytic cell comprising an anode of a second composition, which is different than the composition of the anodes in the first electrolyzer 104. The wastewater is treated in the second electrolyzer 106 and the effluent stream 130 is directed from the second electrolyzer back to the reactor tank 102 while continuing to measure the contaminant concentration in the stream of wastewater 109 supplied from the reactor tank to the second electrolyzer. The treatment process in the second electrolyzer is continued until the contaminant concentration measured in the stream of wastewater 109 from the reactor tank 102 reaches a predetermined target value which indicates that the wastewater has met the regulatory conditions and then the wastewater is then discarded.

The first composition of the anodes in the first electrolyzer are selected from the materials which can treat the main contaminants in the wastewater stream and are not substantially damaged by the by-products generated in the first electrolyzer. The second composition of the anodes in the second electrolyzer is selected from the materials which are efficient at treating the byproducts or at least the main byproduct of the wastewater treatment reaction in the first electrolyzer or which are efficient at treating the byproducts or at least the main byproduct of the treatment reaction and could also treat the main contaminants in the wastewater efficiently but might be damaged by the byproducts during the treatment of the main contaminants in the wastewater if operating for longer periods of time.

The wastewater is treated in the first electrolyzer until the contaminant concentration in the stream of wastewater supplied from the reactor tank remains substantially constant, respectively until the contaminant concentration removal rate drops to around zero. The contaminant concentration can be measured as COD or TOC concentration.

Other embodiments of the present system can comprise one or more electrolyzers which are activated sequentially, if necessary, and which can destroy the byproducts of the reaction in the electrolyzers where the wastewater was already treated.

Figure 2:
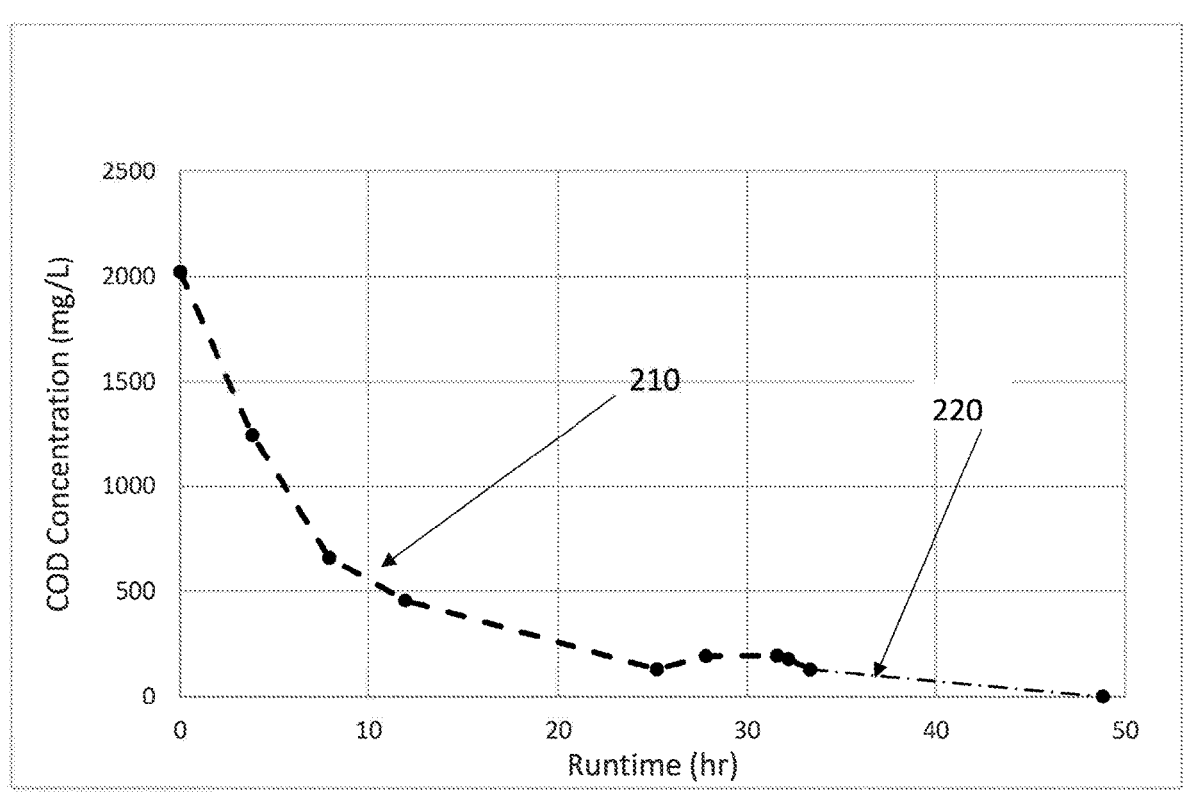
FIG. 2 illustrates a graph of a chemical oxygen demand (COD) concentration reduction achieved while treating a wastewater containing IPA according to the present method.
Figure 3:
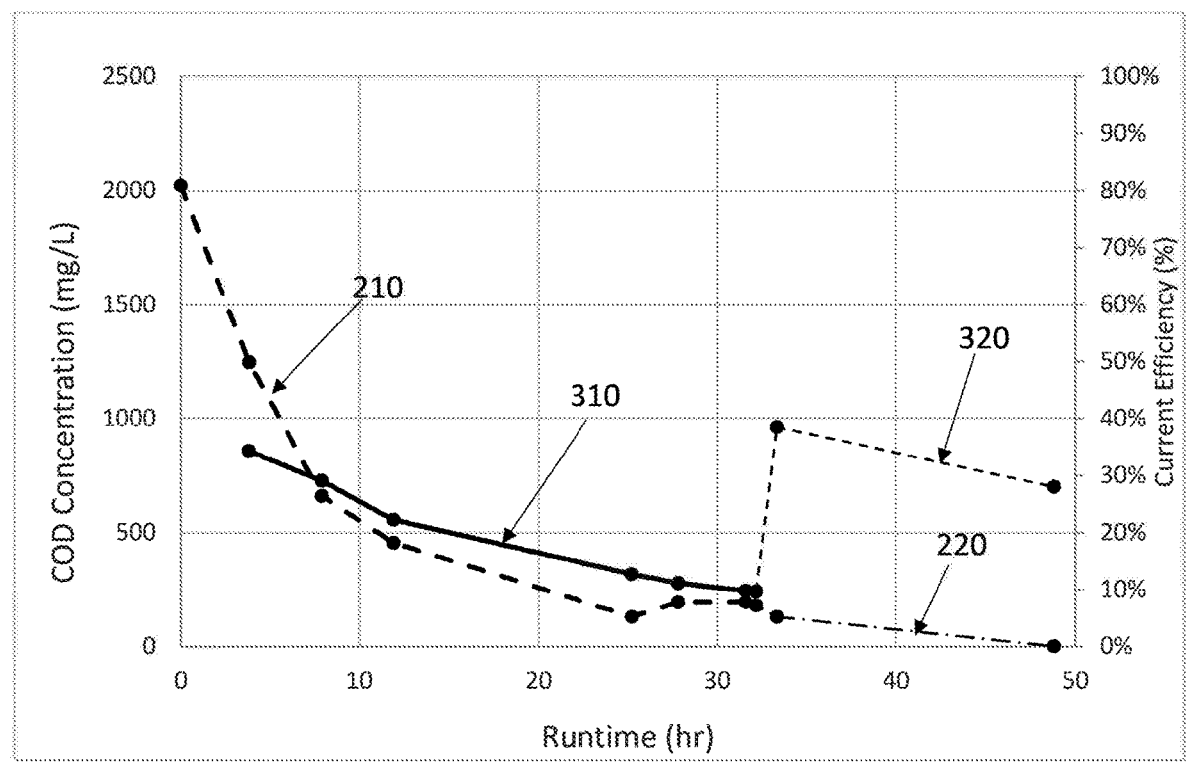
FIG. 3 illustrates the graph of the COD concentration reduction illustrated in FIG. 2 together with the efficiency achieved by the method described in the present invention.
Figure 4:
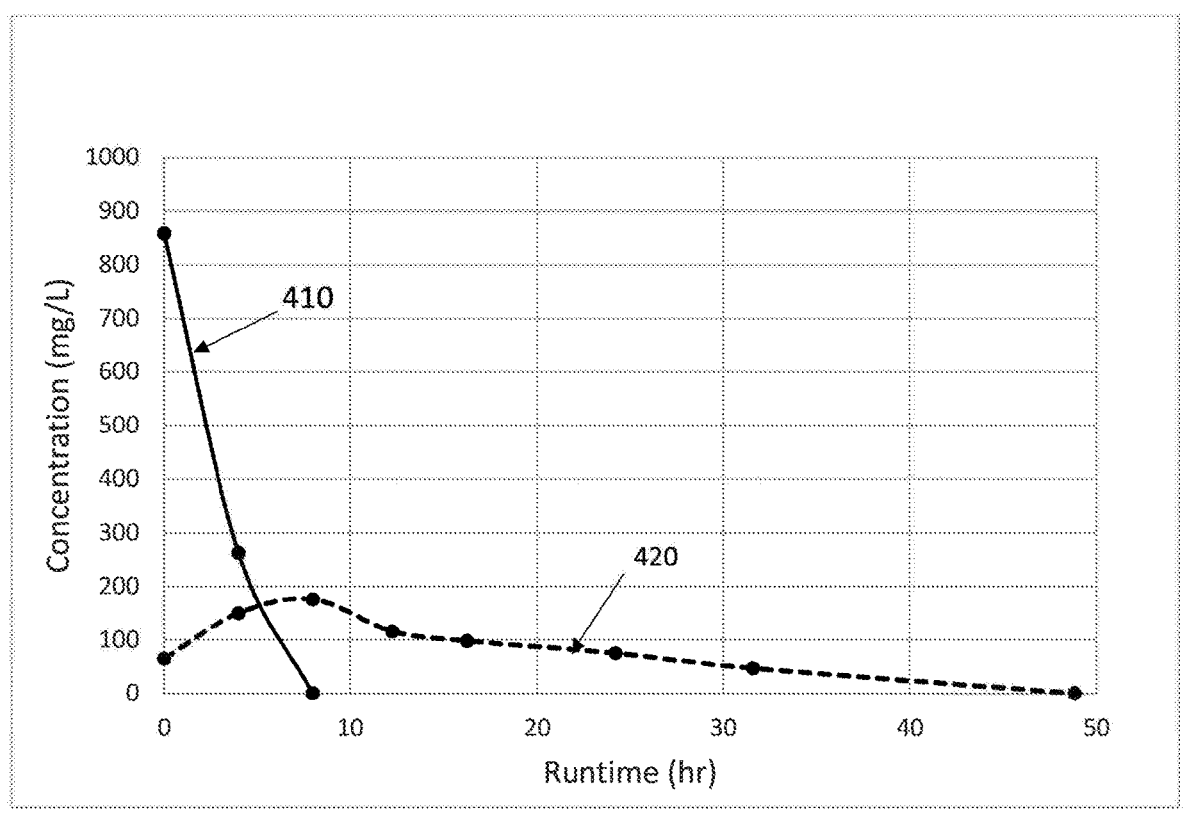
FIG. 4 illustrates the reduction in concentration of the two main contaminants in a wastewater stream which was treated according to the present method.

FIG. 2, FIG. 3 and FIG. 4 illustrate the results obtained by treating wastewater comprising isopropyl alcohol (IPA) and acetone in the system illustrated in FIG. 1 comprising a first electrolyzer having anodes made of precious metal oxide (PMO) plates and a second electrolyzer having anodes made of boron doped diamond (BDD) plates.

As illustrated in FIG. 2 the stream of wastewater to be treated had a total contaminant concentration of 2022 mg/l COD (chemical oxygen demand) including 680 mg/l IPA and 115 mg/l acetone. After around 26 hours of treating the wastewater in the first electrolyzer with PMO anodes the COD concentration in the wastewater supplied from the reactor tank to the first electrolyzer, illustrated by curve 210, dropped to around 130 mg/l and thereafter the COD concentration reached a plateau whereby the contaminant (COD) concentration was starting to become constant, increasing slightly at the beginning to about 194 mg/l and then fluctuating between around 180 to around 195 mg/l over a period of around 7 hours. It was also noted that the IPA concentration remained constant at around 10 mg/l and the acetone concentration remained relatively constant (between 50 and 80 mg/l). At that point the wastewater treatment in the first electrolyzer was stopped and the wastewater treatment in the second electrolyzer began. After operating the second electrolyzer for about another 17 hours the COD concentration in the stream of wastewater supplied from the reactor tank was reduced to over 99% removal as indicated by curve 220 in FIG. 2. In this example the switch between the first electrolyzer and the second electrolyzer was done when the COD removal rate (COD concentration per hr) was close to zero.

The efficiency of the treatment using the present system and method is illustrated in FIG. 3. From the illustrated results it can be seen that that current efficiency, which correlates the amount of contaminant (COD) removed with the applied current and the amount of treatment time, starts to drop while the wastewater is being treated in the first electrolyzer comprising the PMO anodes as illustrated by curve 310 and the it rises again when the wastewater to be treated is being supplied to the second electrolyzer comprising the BDD anodes, as illustrated by curve 320.

The results of another test done using the present method to treat a stream of wastewater containing 858 mg/l of IPA and 65 mg/l acetone within a total amount of COD of 2366 mg/l is illustrated in FIG. 4. In this test it was seen that while the IPA concentration drops during treatment in the first electrolyzer comprising the PMO anodes as illustrated by curve 410, the acetone concentration illustrated by curve 420 starts to increase because acetone is also generated as a byproduct during the IPA treatment in the first electrolyzer. In this example, the wastewater treatment in the first electrolyzer comprising PMO anodes was stopped after around 32 hours of operation when it was observed that further COD reduction can not be achieved as measured by the COD removal rate and the stream of wastewater was supplied to the second electrolyzer which achieved a reduction to non-detect (less than 10 mg/l COD) using the BDD electrodes to eliminate the acetone. At the time of the switch, in this case, there was no IPA left in the stream of wastewater to be treated and only the byproduct (acetone) of the reaction in the first electrolyzer was eliminated.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, if any, including U.S. Provisional Patent Application No. 62/847,158, filed May 13, 2019, are incorporated herein by reference, in their entirety. Aspects of the embodiments can be modified, if necessary to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method for the electrochemical treatment of wastewater comprising the steps of:
   a. supplying a wastewater stream to be treated to a reactor tank, wherein the wastewater stream to be treated comprises a contaminant, and supplying a wastewater stream having a contaminant concentration from the reactor tank to a first electrolyzer,
   b. treating the wastewater stream supplied from the reactor tank in the first electrolyzer, wherein the first electrolyzer comprises a stack of electrolytic cells, each electrolytic cell comprising an anode of a first composition, and discarding an effluent stream from the first electrolyzer into the reactor tank,
   c. monitoring the contaminant concentration in the wastewater stream supplied from the reactor tank,
   d. repeating the step of treating the wastewater stream supplied from the reactor tank in the first electrolyzer and discarding the effluent stream from the first electrolyzer into the reactor tank until the first electrolyzer has a contaminant removal rate of about 0 mg/h;
   e. thereafter, stopping the treatment of the wastewater stream supplied from the reactor tank in the first electrolyzer and treating the wastewater stream supplied from the reactor tank in a second electrolyzer comprising a stack of electrolytic cells, each electrolytic cell comprising an anode of a second composition, which is different than the first composition of the anodes in the first electrolyzer, the second composition of the anode of the electrolytic cells in the second electrolyzer being selected from a material which treats byproducts of the reaction in the first electrolyzer, f. treating the wastewater stream supplied from the reactor tank in the second electrolyzer and discarding an effluent stream from the second electrolyzer back to the reactor tank, g. monitoring the contaminant concentration in the wastewater stream supplied from the reactor tank, h. discarding the effluent stream from the second electrolyzer back to the reactor tank until the contaminant concentration in the wastewater stream supplied from the reactor tank to the second electrolyzer reaches a target value, and i. discarding the wastewater from the reactor tank.

2. The method of claim 1 wherein the contaminant concentration of the wastewater stream supplied from the reactor tank is monitored by measuring the chemical oxygen demand concentration in such wastewater.

3. The method of claim 1 wherein the contaminant concentration of the wastewater stream supplied from the reactor tank is monitored by measuring the total organic carbon concentration in such wastewater.

4. The method of claim 1 wherein the first composition of the anodes of the electrolytic cells in the first electrolyzer is selected from a material which treats contaminants in the wastewater stream supplied from the reactor tank and is not damaged by by-products generated in the first electrolyzer.

5. The method of claim 1 wherein the second composition of the anodes of the electrolytic cells in the second electrolyzer is selected from a material which treats the contaminants in the wastewater supplied from the reactor tank.

6. The method of claim 1 wherein stopping of the treatment of wastewater from the reactor tank in the first electrolyzer and starting the supply of wastewater from the reactor tank to a second electrolyzer is performed at a time determined experimentally to correspond to the time when the contaminant removal rate in the first electrolyzer is around 0 mg/h.

7. The method of claim 1 wherein the wastewater stream supplied from the reactor tank contains isopropyl alcohol or isopropyl alcohol and acetone and the first composition of the anode of the first electrolyzer comprises a precious metal oxide and the second composition of the anode of the second electrolyzer comprises diamond or boron-doped diamond.

\* \* \* \* \*